_United States Patent_ [19]

Hatanaka et al.

[11] 4,244,856
[45] Jan. 13, 1981

[54] SILICONE FILLERS FOR POLYSILOXANE COMPOSITIONS

[76] Inventors: Masayuki Hatanaka, 91-8 Shinnakano, Ohra-machi, Ohra-gun, Gunma-ken; Iwao Fukushima, 887-35 Ushizawa, Ohta-shi, Gunma-ken, both of Japan

[21] Appl. No.: 2,277

[22] Filed: Jan. 10, 1979

[51] Int. Cl.³ .............................................. C08L 83/04
[52] U.S. Cl. .................................................. 260/37 SB
[58] Field of Search ..................................... 260/37 SB

[56] References Cited

U.S. PATENT DOCUMENTS

| | | | |
|---|---|---|---|
| 3,108,985 | 10/1963 | Weyer | 260/37 SB |
| 3,826,773 | 7/1974 | Cooke | 260/37 SB |
| 4,108,833 | 8/1978 | Hatanaka et al. | 260/37 SB |
| 4,157,426 | 6/1979 | Hatanaka et al. | 260/37 SB |

*Primary Examiner*—Lewis T. Jacobs
*Attorney, Agent, or Firm*—John L. Young; E. Philip Koltos; Michael J. Doyle

[57] ABSTRACT

A SiH-olefin platinum catalyzed composition with excellent resiliency, compression set and which can be hot air vulcanized having therein a vinyl-containing polysiloxane polymer, a hydrogen-containing polyorganio siloxane, a zero valent platinum phosphorus complex and as the novel ingredient a fine calcined silica powder with a refractive index greater than 1.446 and an ignition loss not exceeding 3% which is obtained by firing a precipitated silica.

21 Claims, No Drawings

SILICONE FILLERS FOR POLYSILOXANE COMPOSITIONS

BACKGROUND OF THE INVENTION

This invention concerns new polyorganosiloxane compositions containing fired silica which give silicone elastomers by thermal vulcanization such as hot air vulcanization which elastomers have good resiliency, good heat resistance in a closed system, low compression set and improved electrical properties and a high modulus.

As reinforcing materials for silicone rubber there are two different series of silica; one is a dry type silica obtained with heat decomposition of halogenated silicon in a high temperature oxygen-hydrogen flame, and the other one is a wet type silica obtained with decomposition of a silicate by acid in the presence of water. The former is called fumed silica and the latter is called precipitated silica, and varieties of these products are extensively used. Other than these, there is silica aerogel as a variation of the wet type silica obtained by adding heat above the critical temperature of the organic solvent and pressure above the critical pressure of the organic solvent to an organogel by replacing the moisture in the silica hydrogel by an organic solvent such as alcohol, in which the silica hydrogel has been obtained by decomposing silicate with acid in the presence of water. Although fumed silica provides silicone rubber with excellent physical and electrical properties except for resiliency and compression set, it requires equipment of special construction and materials, and requires stringent control over reaction conditions because it involves decomposing thermally halogenated silicon at a high temperature. In addition, it is not economically advantageous because it requires treatment of a halogenated hydrogen as a by-product for environmental reasons. As to silicone rubber obtained from the composition using fumed silica as a reinforcing agent, the resiliency is so low and compression set is so high that these are shortcomings of such silicone rubber. Precipitated silica is economically advantageous, because there is no necessity for special equipment in manufacturing, control over reaction and treatment of halogenated hydrogen as a by-product. However, in the case that precipitated silica is used for reinforcement for silicone rubber there are disadvantages such as foaming during the process of hot air vulcanization under normal pressure, low direct current resistance of the silicone rubber obtained and great dielectric loss. Further, despite the complex manufacturing process of silica aerogel, the afore-mentioned disadvantages have never been greatly improved by the use of silica aerogel.

For the purpose of solving the foaming problem of silicone rubber with the use of precipitated silica and improving its electrical properties, various improvements have been made. However, there have been no satisfactory results in the use of precipitated silica alone. Even though the surface of precipitated silica is treated with organosilicon compounds such as organochlorosilanes, organosilazanes, and polyorganosiloxanes, the foaming phenomenon during the process of hot air vulcanization under normal pressure is observed. Accordingly, at present, electrical properties are improved and hot air vulcanization under normal pressure is made possible by means of the use of the expensive fumed silica.

Polyorganosiloxane compositions from the viewpoint of a bridging (vulcanizing) mechanism, can roughly be classified into two categories. One is a conventional method that performs crosslinking or so-called peroxide vulcanization, in which radicals that were formed in the decomposition of organic peroxides through the process of heating polyorganosiloxane with a high degree of polymerization at a high temperature in the presence of an organic peroxide, attack organic groups of the polyorganosiloxane and take hydrogen out and also bring about electron transfer of vinyl groups and so forth. However, the existence of decomposition products of such organic peroxides, particularly of aromatic acyl peroxides that are generally used as a powerful vulcanizers in vulcanized silicone rubber gives an unfavorable influence to silicone rubber. Taking the most popular example of benzoyl peroxide, when benzoic acid formed in the decomposition exists in silicone rubber, it breaks up siloxane chains at high temperatures particularly in the presence of hot steam; consequently it hinders steam resistance and heat resistance in a closed system. Further, various by-products of such peroxides contain health hazardous residues such that there are restrictions in the selection of organic peroxides used as vulcanizers, when the silicone rubber is used for transplanting in the human body, for other medical purposes, food-handling and so forth.

The silicone composition of the present invention is the platinum-cure or addition reaction type silicone rubber in which crosslinking is performed by a hydrosilylation reaction of a polyorganohydrogensiloxane to vinyl groups of a polyorganosiloxane in the presence of small amounts of platinum as a catalyst. This kind of reaction has been used from the earliest times as a vulcanizing mechanism for RTV type silicone rubber which has polyorganosiloxane containing vinyl groups with relatively low degree of polymerization and have fluidity as a base polymer. However, there has been delayed the application of the same reaction to an area in which the degree of polymerization of the base polymer is relatively high. This is attributable to the fact that the stability of such compositions after adding the catalyst is so poor that roll milling operations and other manufacturing processes are impossible to undertake because a complex such as chloroplatinic acid with alcohol, olefin or vinyl containing low polymerized polysiloxane makes the hydrosilyl reaction take place gradually even at room temperatures, and in such a base polymer which has a higher polymerization degree, a slight hydrosilylation gives gelation.

Many methods to control reaction at near room temperature have been reviewed to improve these shortcomings. For example, in the Japan Patent Publication 31476/69, there is disclosed the use as an inhibitor of an organic compound possessing an acetylene bond in which at the alphaposition a functional group containing a nitrogen, phosphorus or sulfur atom exists as well. In the Japan Pat. Publication No. 19193/67 there is disclosed the change of platinum to a divalent platinum complex with phosphorus, so as to inhibit the reaction.

In the case that the inhibitor described in the Japan Pat. Publication No. 31476/69 is used, it has an advantage in that an arbitrary reaction-speed can be selected by means of certain amounts of the inhibitor. However, as a matter of practice, it is difficult to control such an amount, and if any excess amount is added, it may cause poor vulcanization. The inhibitor also cannot play its proper functions well if it evaporates or has an unfavorable influence on the silicone rubber obtained. Furthermore, in the case of the inhibitor described in the Japan Patent Publication No. 19193/67, inhibiting effects can be attained to some extent; however, sufficient results cannot be expected even in this method. Moreover, which such an inhibitor is used, the vulcanization does not proceed even with heating in a closed condition. Moreover, such a method has the common disadvantage that the chlorine contained in a platinum compound has adverse effects on silicone rubber. For the purpose of removing these disadvantages the use of the zero valent platinum phosphorus complex, disclosed in the Japan patent application No. 139853/76, is suggested and the stability of the polyorganosiloxane at room temperature is improved. Furthermore, by adding a stannous salt to this zero valent platinum phosphorus complex it improves the stability of the complex itself and the suggestion is made that it improves the workability of the milling and molding of the silicone rubber. (See Japan patent application No. 61924/77).

Although the utility of addition reaction type silicone rubber has been considerably enlarged by these suggestions, there still exist limitations due to the aforementioned filler; that is; difficulties such as low resiliency, the great compression set and the unfavorable economic feasibility of silicone rubber with fumed silica. Further, there is the poor electrical properties and the foaming problem in the process of hot air vulcanization under normal pressure when precipitated silica is used or aerogel silica. These problems are similar to those observed in the case of peroxide vulcanization.

SUMMARY OF THE INVENTION

The aforementioned disadvantages are resolved by using fine silica, obtained through treatment of precipitated silica at high temperatures, as a reinforcing agent for addition reaction type silicone rubber and by using the zero valent platinum phosphorus complex as a catalyst. As a result, hot air vulcanization has become possible under normal pressure and good resiliency, low compression set, improved electrical properties, excellent flame retardancy, and heat resistance in a closed system have been attained; there have been no health hazards caused from decomposition products of curing agent; and a high modulus elastomer has been obtained. The composition of the present invention comprises:

(A) 100 weight parts of polyorganosiloxane; where the organic groups are selected from a class consisting of monovalent substituted and unsubstituted hydrocarbon groups exist and there are 1.98-2.002 organic groups per silicon atom; wherein 0.01-2 mole percent of the organic groups are vinyl groups and one molecule contains at least 2 vinyl groups; and the degree of polymerization is over 1,000, (B) from 0.1-10 weight parts of polyorganohydrogensiloxane with at least 2 SiH bonds in one molecule, (C) from 10 to 200 weight parts of fine silica powder with refractive index greater than 1.446 and ignition loss not exceeding 3% which is obtained by providing heat treatment for fine silica powder having been obtained through decomposition of silicate; and (D) from 0.0001-0.2 weight parts of a zero valent platinum phosphorus complex.

DESCRIPTION OF THE PREFERRED EMBODIMENT

Polyorganosiloxane of (A) used in this invention is a polyorganosiloxane possessing vinyl groups, and its general formula is commonly expressed as $R^1\text{-}[(R^2)(R^3)SiO]_n\text{-}Si\ R^2\ R^3\ R^1$; wherein in the molecule there can be included some units of $R^1 SiO_{3/2}$ and/or units of $SiO_2$; wherein $R^2$ and $R^3$ are the same or different monovalent organic groups selected from substituted or unsubstituted monovalent hydrocarbon groups and $R^1$ is an organic group selected from the same groups as $R^2$ and $R^3$, and part or all of $R^1$ is allowed to be hydroxyl group(s). The radicals $R^2$, $R^3$, $R^1$ can be alkyl groups such as methyl, ethyl, and propyl and, phenyl groups, and substituted hydrocarbon groups such as chloromethyl, cyanoethyl, trifluoropropyl and chlorophenyl groups. In particular, it is necessary to include 0.01-2 mole percent of vinyl groups and to have more than two vinyl groups in one molecule in order to form a network structure through bridging (vulcanizing) with polyorganohydrogensiloxane.

When the amount of the vinyl groups is less than 0.01 mole percent good vulcanization of silicone rubber is difficult to achieve; and when the content of the vinyl groups is more than 2 mole percent, good heat stability of silicone rubber is not attained. It is preferable that phenyl groups to be in the range of 2 to 10 mole percent of all the organic groups if they are utilized. The resulting silicone rubber has cold temperature resistance and heat resistance, although the presence of phenyl groups exceeding 10 mole percent deteriorates the workability of the composition and the cold temperature resistance is lowered. The rest of the organic groups are preferred to be methyl groups from the viewpoints of the ease of synthesis of polyorganosiloxane, the workability of the compositions, and the cold temperature resistance of the silicone rubber obtained. Substituted hydrocarbon groups such as cyanoethyl or trifluoropropyl groups may also be used in part in order to furnish, oil resistance to the silicone rubber.

The quantity of organic groups bonded to the silicone atom is selected in the range of 1.980 to 2.002 per one silicon atom. Above this range, a satisfactory polymerization degree cannot be attained and below this range good rubber-like elastomer cannot be attained. The degree of polymerization of polyorganosiloxane must be over 1,000 in order to obtain silicone rubber with good mechanical properties. However, where it is desired to take into consideration the workability in the manufacturing process to obtain uniform compositions by kneading, it is desirable to have the degree of polymerization in the range of 2,000 to 10,000.

Although polyorganohydrogensiloxane (B) used in this invention may have any siloxane chain such as a linear, branched or cyclic chain, it is necessary that there are at least two SiH bonds in one molecule. The organic group is generally a monovalent hydrocarbon group containing no aliphatic unsaturated bonds. From the viewpoints of easy availability and easy handling of raw materials, the monovalent group is preferably selected from alkyl and phenyl groups, and methyl group are especially desirable. No restriction in the degree of polymerization is set, but it is desirable to be in the range of 4 to 1,000. When the polymerization degree is less than 4, the volatility is too high to handle; and when the polymerization degree is more than 1,000, the viscosity is so high that mixing with polyorganosiloxane possessing vinyl groups becomes difficult. Above all, a degree of polymerization between 10 and 50 is particularly desirable from the standpoints of ease of synthesis and ease of addition to polyorganosiloxanes containing vinyl group.

An amount of polyorganohydrogensiloxane is selected in the range of weight parts of 0.1 to 10 for 100 weight parts of polyorganosiloxane cited in (A). It is impossible to supply SiH bonds required for imparting good physical properties when the hydrogen siloxane is less than 0.1 weight parts. When it exceeds 10 weight parts, the SiH bond becomes excessive, and as a result, the heat resistance of silicone rubber is injured; or the SiH bond density becomes lowered and as a result the mechanical properties of silicone rubber deteriorate.

Calcined silica used in (C) of this invention, is obtained by treatment of precipitated silica at high temperatures, whose refractive index is greater than 1.446 and whose ignition loss is less than 3%. The refractive index mentioned above is measured in the following way. Fumed silica powder is suspended in carbontetrachloride whose refractive index has already been measured by Abbe's refractometer at various temperatures and whose index was already determined. Then the temperature is varied, and the refractive index of the suspension at the temperature at which the suspension liquid becomes transparent is determined as a measured value.

Precipitated silica used here is obtained by a normal procedure by decomposing silicate in the presence of water. For example, an aquous solution of sodium silicate as a major ingredient is decomposed with inorganic acid or their anhydrides such sulfuric acid, hydrochloric acid, nitric acid, phosphorus acid, hydrofluorosilic acid, carbon dioxide, and sulfur dioxide, and thus fine silica powder is precipitated. This process is desirable, especially from the standpoint of an easy manufacturing process. The refractive index of the precipitated silica is in the range of 1.437 to 1.440, and the ignition loss is over 3%. It is necessary that by treating this fine silica at high temperatures, the refractive index becomes more than 1.446 and the ignition loss becomes less than 3%, enabling hot air vulcanization under normal pressure and obtaining silicone rubber with good electrical properties. In order to obtain fired silica with the above-mentioned refractive index and the ignition loss, treatment over 700° C. is desirable for at least 5 minutes and more preferably from 5 to 300 minutes.

The quantity of calcined silica is in the range of 10 to 200 weight parts for 100 weight parts of polyorganosiloxane (A). When the quantity is less than 10 weight parts, adequate reinforcing effects are not attainable; and when it is greater than 200 weight parts, compounding is more difficult.

The zero valent platinum phosphorus complex used in (D) is a catalyst which vulcanizes the compositions (A) and (B) of the aforementioned organopolysiloxane and is expressed as $[Q_3P]_4Pt$; wherein Q is selected from similar or different substituted or unsubstituted alkyl groups, aryl groups, alkylene groups, alkoxy groups and aryloxy groups. Examples of these complexes are:

$[(CH_3)_3P]_4Pt$
$[(C_4H_9)_3P]_4Pt$
$[(C_6H_5)_3P]_4Pt$
$[(CH_3O)_3P]_4Pt$
$[(C_4H_9O)_3P]_4Pt$
$[(C_6H_5O)_3P]_4Pt$
$[(ClC_6H_4O)_3P]_4Pt$
$[(p-Cl-C_6H_4)_3P]_4Pt$
$(p-Cl-C_6H_4)_3P[(C_6H_5O)_3P]_3Pt$
$(C_6H_5)_3P[(p-Cl-C_6H_4O)_3P]_3Pt$
$[(C_2H_5)_2(C_6H_5)P]_4Pt$
$[(C_2H_5O)_2(C_6H_5O)P]_4Pt$
$[(C_6H_5)_2(C_2H_5)P]_4Pt$
$[(CH_3)_2(C_2H_5O)P]_4Pt$
$[(CH_3)_2(C_4H_9O)P]_4Pt$
$[(C_6H_5)_3P]_4Pt$
$[(C_6H_5O)_3P]_4Pt$

Especially $[(C_6H_5)_3P]_4Pt$ and $[(C_6H_5O)_3P]_4Pt$ are recommended due to the ease in which they can be obtained and synthesized. The amount of the zero valent platinum phosphorus complex is selected in the range of 0.0001 to 0.2 weight parts of the ingredient of (A) and the range is usually 0.0001 to 0.1. When the amount of the zero valent platinum phosphorus complex is less than this range adequate vulcanizing speed and self-extinguishing cannot be attained; and, when it is greater than this range, it affects the heat resistance property.

For the purpose of enhancing stability of this zero valent platinum phosphorus complex, adding stannous salt to this complex is recommended. By adding this stannous salt, the zero valent platinum phosphorus complex can be prevented from decomposition and from changing to other platinum compounds. As stannous salts, there is recommended stannous halides such as hydrate and especially dihydrate of stannous chloride, stannous bromide and stannous carbonates such as stannous octoate, stannous oleate and stannous maleate. The amount of additives of these stannous salts is desirable to be in the range of 0.1 to 20 times (weight) for the zero valent platinum phosphorus complex, and to be 0.3 to 3 times (weight) in order to attain the proper extruding time.

If necessary, it is all right to dissolve the complex in a solvent with which it dissolves.

Carbon black, crushed quartz, diatomaceous earth, metal carbonate, clay, talc, titanium dioxide, and red iron oxide can be added to the compositions of this invention as a semi-reinforcing and non-reinforcing filler or pigment. Fumed silica may be used together with the fired silica as a reinforcing filler. Low molecular weight polyorganosiloxane blocked with alkoxy group(s) or hydroxyl group(s) at the end may be added as a process aid, while organic acid metal salts, iron oxide or ferrite may be added as a thermal resistance improver. However, such substrates as cadmium compounds or lead compounds that hamper the catalytic reaction of platinum must not be used.

The compositions obtained in this invention provide silicone rubber with excellent resiliency and low compression set as compared with the compositions using fumed silica as a reinforcing filler. There is also the advantage that hot air vulcanization is possible under normal pressure compared with the composition using precipitated silica as a reinforcing filler. In addition, silicone rubber with superior electrical properties is provided. As compared with rubber vulcanized with organic peroxides using calcined silica as a reinforcing filler, the compositions produce silicone rubber having flame retardancy, excellent heat resistance under closed condition, low compression set and no hazards to health.

Accordingly, the composition in this invention provides silicone rubber for wire and cable insulation which can be hot air vulcanized at normal pressure and has excellent electrical properties, and also provides silicone rubber which is suitable for tubings, extruding molding products, packings, and gaskets.

Following are descriptions of the practical examples of this invention. In these examples, parts are all weight parts. Fired silica used in these practical examples is indicated in Table 1. The amount of the platinum phosphorus complex is expressed in weight parts for 100 weight parts of silicone rubber compounds (phc).

minutes under a pressure of 30 kg/cm$^2$; and an elastomer is obtained whose physical properties are measured in accordance with JIS K6301. (2)This elastomer is post-cured at 150° C. for one hour, and its electrical properties are measured in accordance with JIS C2123. Post-cure in the specifications is the process in which a substance press cured under pressure is again thermally vulcanized in hot air.) (3) Besides the above, the afore-

TABLE 1

|  | Silica | | | Silica | Silica |
|---|---|---|---|---|---|
|  | F | G | H | J | K |
| Manufacturing method of precipitated | Decomposing liquid silica glass by sulfuric acid | | | Decomposing Liquid glass by hicrochloric acid | Decomposing liquid glass by carbon dioxide |
| Firing Temperature (C) | 800 | 800 | 850 | 850 | 800 |
| Firing Time (h) | 1 | 3 | 3 | 1 | 1 |
| Heat loss (%) | 3.1 | 2.25 | 2.85 | 2.9 | 3.2 |
| Ignition loss (%) | 0.96 | 0.76 | 0.31 | 0.42 | 0.92 |
| Refractive index n$^{25}$D | 1.450 | 1.451 | 1.454 | 1.452 | 1.449 |
| Apparent specific gravity g/m$^1$ | 0.13 | 0.135 | 0.13 | 0.15 | 0.14 |
| Specific surface area m$^2$/g | 130 | 125 | 120 | 122 | 132 |

EXAMPLE 1

To 100 parts of polydimethylsiloxane (the degree of polymerization is approximately 6,000), whose end is blocked with a trimethylsilyl group and containing 0.2 mole percent of methylvinylsiloxane unit there is added 2 parts of polydimethylsiloxane (viscosity is 28 centistoke at 25° C.) having a methoxy group at the polymer chain ends and the mixture is put in a kneader, and kneaded at 30 rpm while 50 parts of fired silica F are slowly added to the mixture. The temperature is raised to 160° C. and kneading is continued for 2 hours, and then the silicone rubber compound is prepared. To this compound, polymethylhydrogen-siloxane (the degree of polymerization is 30) whish is endblocked with a trimethylsilyl group and [(C$_6$H$_5$)$_3$P]$_4$Pt are compounded in the ratio shown in Table 2. Thus, the composition samples 11 and 12 of this invention are prepared. In the same way, instead of silica F, 50 parts of precipitated silica (ignition loss 5.02%, refractive index 1.437, apparent specific gravity 0.17) obtained through decomposition of liquid glass by hydrochloric acid is used and sample 13 is provided as a comparative example. (1) These samples are press cured at 170° C. for 10 mentioned composition samples and comparative example sample are vulcanized in hot air at 250° C. for 5 minutes under normal pressure, and foaming observed. These results are shown in Table 2.

TABLE 2

| Sample No. | 11 | 12 | (Comparative example 13) |
|---|---|---|---|
| Methylhydrogenpolysiloxane ended with trimethylsilyl group, phc | 0.5 | 0.5 | 0.5 |
| [(C$_6$H$_5$)$_3$P]$_4$Pt, phc | 0.001 | 0.003 | 0.002 |
| Vulcanizing Conditions (1) | | | |
| Hardness | 50 | 54 | 53*$^3$ |
| Tensile strenghth kg/cm$^2$ | 64 | 74 | 55*$^3$ |
| Elongation % | 300 | 260 | 190*$^3$ |
| 200 modulus kg/cm$^2$ | 43 | 59 | — |
| Vulcanizing Conditions (2) | | | |
| Dielectric tangency (normal)*$^1$ % | 2.9 | 2.8 | 18.7 |
| Dielectric rate (normal) | 3.2 | 5.2 | 6.7 |
| Volume resistance (normal) | 3.2 × 10$^{15}$ | 4.4 × 10$^{15}$ | 3 × 10$^{13}$ |
| Volume Resistance (hydrophilic)*$^2$ | 4.0 × 10$^{15}$ | 5.0 × 10$^{15}$ | 8 × 10$^{12}$ |
| Vulcanizing Conditions (3) | | | |
| Foaming | None | Mpme | None |

REMARKS:
*$^1$the value cooled to room temperature
*$^2$the value after soaking in water for 24 hours
*$^3$These are not accurate because of foaming.

EXAMPLE 2

To 100 parts of polydimethylsiloxane (the degree of polymerization is 7,000) which is endblocked with dimethylvinylsilyl group, and containing 0.2 mole percent of methylvinylsiloxane unit, there is added 0.3 parts of vinyltriethoxysilane, as process aid, 2 parts of polydiorganosiloxane (viscosity 50 cst at 25° C.) which is endblocked with methoxy group with mole ratio 2:1 for dimethylsiloxane unit-diphenylsiloxane unit, and the ingredients are put in a kneader and kneaded at 30 rpm while 40 parts of silica F is slowly added. After keeping 100 parts of silicone rubber compound prepared in the above method at room temperature for 30 days 10.6 parts of polymethylhydrogensiloxane consisting of 67 mole percent of dimethylhydrogensiloxane and 33 mole percent of SiO$_2$, 0.003 parts of [(C$_6$H$_5$)$_3$P]$_4$Pt are added to the above compound and uniformly mixed. Thus sample 21 is prepared. In the same way, instead of silica F, 40 parts of fumed silica "Aerogel 200" (a brand name of Nippon Aerogel Co.) is used to prepare comparative example sample 22. These materials are press cured at 170° C. for 10 minutes under the pressure of 30 kg/cm$^2$; consequently silicone rubber with high resiliency and low compression set is obtained from sample 21 shown in Table 3.

TABLE 3

| Sample No. | 21 | 22 (Example) |
|---|---|---|
| Hardness (JIS) | 43 | 45 |
| Tensile Strength kg/cm$^2$ | 76 | 90 |
| Elongation % | 370 | 450 |
| Elasticity % | 70 | 50 |
| Compression Set % | 9 | 25 |

EXAMPLE 3

To 100 parts of polydimethylsiloxane (the degree of polymerization 6,000) which is endblocked with a trimethylsilyl group, containing 0.2 mole percent of methylvinylsiloxane unit, there is added 0.3 parts of vinyltriethoxysilane, 2 parts of the same process aid as cited in Example 2, 25 parts of silica F, and 20 parts of Aerogel 200 (a brand name of Nippon Aerogel Co., Ltd.) and the ingredients are kneaded in the same way as in Example 1. Then a silicone rubber compound is obtained. To 100 parts of this silicone rubber compound, 0.5 parts of the same methylhydrogenpolysiloxane as used in Example 1, and 0.003 parts of $[(C_6H_5)_3P]_4Pt$ are compounded by roll. (1) This compound is press cured at 170° C. for 10 minutes under a pressure of 30 kg/cm$^2$, and a silicone rubber with good physical properties is obtained as shown in Table 4. (2) Furthermore, this is post-cured at 150° C. for one hour, and excellent electrical properties are exhibited.

TABLE 4

| Vulcanizing Condition (1) | |
|---|---|
| Hardness (JIS) | 54 |
| Tensile Strength kg/cm$^2$ | 86 |
| Elongation % | 320 |
| 200% modulus kg/cm$^2$ | 50 |
| Vulcanizing Condition (2) | |
| Dielectric Loss % | 0.2 |
| Dielectric Constant | 3.0 |
| Volume Resistivity | $6.0 \times 10^{16}$ |

EXAMPLE 4

To 100 parts of polydimethylsiloxane (the degree of polymerization 7,500), which is endblocked with a dimethylvinylsilyl group, containing 0.1 mole percent of methylvinylsiloxane unit there is added 1 part of process aid as in Example 2, and 30 parts of silica H and the mixture is kneaded, and silicone rubber compound is thus obtained. To 100 parts of this silicone rubber compound, 0.7 parts of the same polymethylhydrogensiloxane as in Example 1 are added and a catalyst or catalytic compound indicated in Table 5 are added by roll and Samples 41 to 45 are thus prepared. The catalytic compound has been kept for 7 days after its preparation. When these samples are press cured for 10 minutes under a pressure of 30 kg/cm$^2$, silicone rubber with the physical properties in Table 5 is obtained.

TABLE 5

| Sample No. | 41 | 42 | 43 | 44 | 45 |
|---|---|---|---|---|---|
| Catalytic Composition, phc | | | | | |
| $[C_6H_5)_3P]_4Pt$ | 0.003 | — | — | 0.003 | — |
| $[(C_6H_5O)_3P]_4Pt$ | — | 0.003 | 0.002 | — | 0.003 |
| $SnCl_2 \cdot 2H_2O$ | — | — | 0.0015 | — | — |
| $Sn(OCOC_8H_{17})_2$ | — | — | — | 0.002 | 0.003 |
| Dioxane | — | — | 0.1 | — | — |
| Physical Properties | | | | | |
| Hardness (JIS) | 36 | 36 | 35 | 35 | 34 |
| Tensile Strength (kg/cm$^2$) | 55 | 53 | 55 | 57 | 52 |
| Elongation (%) | 360 | 370 | 360 | 370 | 350 |
| 200% Modulus (kg/cm$^1$) | 28 | 26 | 26 | 26 | 24 |
| Resiliency | 65 | 66 | 65 | 67 | 65 |
| Compression Set | 14 | 15 | 16 | 15 | 17 |

EXAMPLE 5

To 100 parts of polydimethylsiloxane (the degree of polymerization is 6,500), which is endblocked with a trimethylsilyl group, containing 0.2 mole percent of methylvinylsiloxane there is added 0.3 parts of vinyltriethoxysilane and 2 parts of the process aid used in the Example 2 and the ingredients are kneaded, to which 50 parts of silica G is added during the kneading operation at a rotating speed of 30 rpm. The temperature is further raised to 150° C. and the kneading is continued for 3 hours, and silicone rubber compound is thus prepared. To 100 parts of this silicone rubber compound; 1.2 parts of polymethylhydrogensiloxane consisting of 40 mole percent of dimethylsiloxane unit and 60 mole percent of methylhydrogensiloxane unit (the degree of polymerization is 40); and the catalyst indicated in Table 6 is added and Samples 51 to 53 are thus prepared. Each of these samples are press cured at 170° C. for 10 minutes under a pressure of 30 kg/cm$^2$ and silicone rubber with properties indicated in Table 6 is obtained.

TABLE 6

| Sample No. | 51 | 52 | 53 |
|---|---|---|---|
| Catalyst phc | | | |
| $[(C_4H_9O)_3P]_4Pt$ | 0.003 | — | — |
| $[(p-ClO_6H_4)_3P]_4Pt$ | — | 0.005 | — |
| $[(C_6H_5)_2(C_2H_5)P]_4Pt$ | — | — | 0.005 |
| Physical Properties | | | |
| Hardness (JIS) | 57 | 58 | 58 |
| Tensile Strength kg/cm$^2$ | 76 | 77 | 75 |
| Elongation % | 250 | 240 | 240 |
| Compression Set % | 13 | 16 | 12 |

EXAMPLE 6

To 100 parts of silicone rubber compound obtained in Example 5, 0.6 parts of polymethylhydrogensiloxane (excluding comparative Example 63), and catalytic compound with ingredients indicated in Table 7 are compounded by roll and Composition Sample 61, Comparative Samples 62 and 63 are thus prepared. Each of these samples is continuously extruded in a sheet form with a dimension of 60 mm width $\times$ 2 mm thickness by an extruder kept at the temperature below 40° C. by cold water. These sheets are put in an air heating furnace at 250° C. for 5 minutes, and silicone rubber sheets are obtained. However, comparative Sample 62 produces gelation in the extruder and good quality sheets cannot be obtained. Succeeding this, a comparison test for heat resistance under closed condition between Samples 61 and 63 is conducted. In heat resistance test under closed condition, the aforementioned sample sheet is punched out by JIS No. 4 type dumbel, and a punched sample is put in a glass test tube of the size 160 mm×16 mm inside diameter and heat aged at 200° C. for 24 hours; then the tube is opened and sample is taken out of the tube for evaluation in terms of (absolute value of) the changes in hardness, changes (%) of tensile strength and elongation.

These parameters are important in the observation of changes in physical properties when silicone rubber is heated under closed conditions.

Physical properties and heat resistance properties of silicone rubber obtained under the following conditions are indicated in Table 7.

TABLE 7

|  | Comparative Example | | |
|---|---|---|---|
| Sample No. | 61 | 62 | 63 |
| Catalytic Compositions | [(C$_6$H$_5$)$_3$P]$_4$Pt (0.0025) | H$_2$PtCl$_6$ . 6H$_2$O (0.002) | [Cl$_2$C$_6$H$_4$COO]$_2$ (0.7) |
| ( ) inside : phc | SnCl$_2$ . 2H$_2$O (0.0015) | [(CH$_3$)(C$_2$H$_3$)SiO]$_4$ (0.002) | Methyl silicone fluid (0.7) |
| Physical Properties | | | |
| Hardness (JIS) | 50 | —*1 | 53 |
| Tensile Strength kg/cm$^2$ | 69 | —*1 | 66 |
| Elongation % | 300 | —*1 | 270 |
| Compression Set % | 8 | —*1 | 30 |
| Heat Resistance Condition (1) | | | |
| Change in Hardness % | −6 | | −17 |
| Change in Tensile Strength % | −20 | | −38 |
|  | −14 | | +5 |
| Heat Resistance Condition (2) | | | |
| Change in Hardness % | −6 | | −20 |
| Change in Tensile Strength % | −25 | | −50 |
|  | −14 | | +10 |

REMARK:
*1 molding is impossible

EXAMPLE 7

100 parts of polydimethylsiloxane (the degree of polymerization is 7,000) containing 0.2 mole percent of methylvinylsiloxane end-blocked with trimethylsilyl group; 0.3 parts of vinyltriethoxysilane; 2 parts of the process aid used in Example 2, 40 parts of each silica indicated in Table 8; and 30 parts of crushed quartz are kneaded in the same manner as described in Example 1, and silicone rubber compound is obtained. Composition Samples 71 to 73 are prepared by roll milling of 0.4 parts of polymethylhydrogensiloxane in Example 1 and 0.001 parts of [(C$_6$H$_5$)$_3$P]$_4$Pt. After these samples have been press cured at 170° C. for 10 minutes under a pressure of 30 kg/cm$^2$, and post-cured at 200° C. for 4 hours. Thus silicone rubber with physical properties indicated in Table 8 is obtained.

TABLE 8

| Sample No. | 71 | 72 | 73 |
|---|---|---|---|
| Silica | H | J | K |
| Hardness (JIS) | 51 | 50 | 52 |
| Tensile Strength kg/cm$^2$ | 74 | 79 | 75 |
| Elongation % | 250 | 260 | 240 |
| 200% Modulus kg/cm$^2$ | 60 | 63 | 66 |
| Compression Set % | 14 | 15 | 13 |

EXAMPLE 8

Using the polydiorgansiloxane indicated in Table 9, polydimethylsiloxane (viscosity 17 centistokes at 25° C.) containing methoxy group at the end, as a process aid, silica G or precipitated silica (the same as in comparative Sample 13 of Example 1) is slowly added under mixing, the temperature being raised to 150° C., and they are moreover kneaded for 3 hours, thus silicone rubber compound is prepared. To 100 parts of silicone rubber compound; 0.6 parts of polymethylhydrogensiloxane used in Example 2; 0.003 parts of [(C$_6$H$_5$)$_5$P]$_4$Pt are compounded. Thus composition Samples 81 to 84 and comparative Sample 85 in this invention are prepared. These samples are press cured at 230° C. for 5 minutes, and the foaming situation is observed. As a result, foaming cannot be observed in the sample using silica G as shown in Table 9.

TABLE 9

| Sample No. | 81 | 82 | 83 | 84 | Comparative Example 85 |
|---|---|---|---|---|---|
| Polyorganosiloxane End-block | Hydroxy | Trimethylsilyl | Trimethylsilyl | Trimethylsilyl | Trimethylsilyl |
| mole % | | | | | |
| Dimethylsiloxane Unit | 99.8 | 91.3 | 93.8 | 87.8 | 87.8 |
| Methylvinylsiloxane Unit | 0.2 | 0.2 | 0.2 | 0.2 | 0.2 |
| Diphenylsiloxane Unit | — | 8.5 | — | — | — |
| (-cyanoethyl) methylsiloxane | — | — | 6.0 | — | — |
| (3,3,3-trifluoropropyl) methylsiloxane Unit | — | — | — | 12.0 | 12.0 |
| Polymerization Degree (Approximately) | 9,000 | 3,000 | 3,000 | 3,500 | 3,500 |
| Silica | G | G | G | G | Precipitated Silica |

TABLE 9-continued

| Sample No. | 81 | 82 | 83 | 84 | Comparative Example 85 |
|---|---|---|---|---|---|
| Foaming | None | None | None | None | Foaming |

EXAMPLE 9

To 100 parts of the silicone rubber compound obtained in Example 5, 0.003 parts of $(C_6H_5)_3P_4Pt$, and the following polyorganohydrogensiloxane are compounded by roll milling. Thus, Composition Samples 91 and 92 are prepared. The polyorganohydrogensiloxane of Sample 82 in Example 8 is used in Sample 93.

| Sample 91 | $+(CH_3)(C_6H_{13})SiO] - [(CH_3)HSiO]_{\overline{37}}$ | 0.8 parts |
|---|---|---|
| Sample 92 | $(CH_3)_3SiO[(CH_3)(C_{12}H_{25})SiO]_4[(CH_3)HSiO]_{23}Si(CH_3)_3$ (average formula) | 0.7 parts |
| Sample 93 | $(CH_3)_3SiO[(C_6H_5)_2SiO]_2[(CH_3)HSiO]_8Si(CH_3)_3$ (average formuala) | 0.6 parts |

When each of these samples are press cured at 130° C. for 20 minutes under the pressure of 30 kg/cm², (however, Sample 93 is at 170° C. for 10 minutes) good quality silicone rubber is obtained from each sample.

We claim:

1. A non-foaming hot air vulcanizable SiH-olefin platinum composition with excellent resiliency and compression set comprising:
   (A) 100 parts by weight of a polydiorganosiloxane having 1.98–2.002 organic groups per silican atom wherein said organic groups are selected from the class consisting of monovalent substituted and unsubstituted hydrocarbon groups and wherein 0.01–2 mole percent of the total number of organic groups are vinyl radicals and 1 molecule of the polymer contains at least 2 vinyl radicals, and the degree of polymerization is over 1,000.
   (B) from 0.1 to 10 parts by weight of a polyorganohydrogensiloxane with at least 2 SiH bonds in 1 molecule;
   (C) from 10 to 200 parts by weight of a fine fired silica powder having a refractive index greater than 1.446 and an ignition loss not exceeding 3 percent which is obtained by providing heat treatment for a fine silica powder wherein said fine silica powder is obtained through the acid decomposition of a silicate whose major ingredient is a sodium silicate; and
   (D) from 0.0001 to 0.2 parts by weight of a zero valent platinum phosphorus complex.

2. A composition as in claim 1, in which the organic group of said polydiorganosiloxane is a monovalent group selected from the class consisting of methyl, vinyl and phenyl groups and the proportion of the vinyl groups to the total quantity of the organic groups is in the range of 0.01 to 2 mole percent.

3. A composition as in claim 1, in which the degree of polymerization of a polydiorganosiloxane (A) is in the range of 2,000 to 10,000.

4. A composition as in claim 1, in which the fired silica (C) is obtained by heat treatment of the fine silica powder at at temperature exceeding 700° C.

5. The composition of claim 1, in which there is present from 0.1 to 20 times by weight of stannous salt per unit weight of the zero valent platinum phosphorus complex (D).

6. The composition of claim 1, in which the platinum phosphorus complex is expressed as $[Q_3P]_4Pt$, wherein Q is selected from the class consisting of a phenyl group and a phenoxy group.

7. The composition of claim 1, wherein there may be further present in the composition an additional filler selected from the class consisting of fumed silica, carbon black, crushed quartz, diatomaceous earth, metal carbonates, clay, talc, titanium dioxide and iron oxide.

8. A process for forming a non-foaming hot air vulcanizable SiH-olefin platinum catalyzed composition with excellent resiliency and compression set comprising the steps of (i) mixing:
   (A) 100 parts by weight of a polydiorganosiloxane having 1.98–2.002 organic groups per silican atom wherein said organic groups are selected from the group consisting of monovalent substituted and unsubstituted hydrocarbon groups and wherein 0.01–2 mole percent of the total number of organic groups are vinyl radicals and one molecule of the polymer contains at least two vinyl radicals, and the degree of polymerization goes over 1,000;
   (B) from 0.1 to 10 parts by weight of a polyorganohydrogensiloxane with at least 2 SiH bonds in 1 molecule;
   (C) from 10 to 200 parts by weight of a fine fired silica powder having a refractive index greater than 1.446 and an ignition loss not exceeding 3%, which is obtained by heat treatment for a fine silica powder wherein said fine silica powder is obtained through the acid decomposition of a silicate whose major ingredient is a sodium silicate; and
   (D) from 0.0001 to 0.2 parts by weight of a zero valent platinum phosphorus complex; and (ii) allowing the composition to cure.

9. The process of claim 8, wherein the organic group of said polydiorganosiloxane is a monovalent group selected from the class consisting of me, iyl, vinyl and phenyl groups and the proportion of the vinyl groups to the total quantity of organic groups is in the range of 0.01 to 2.0 mole percent.

10. The process of claim 8, wherein the degree of polymerization of the polydiorganosiloxane (A) is in the range of 2,000 to 10,000.

11. The process of claim 8, in which the fired silica (C) is obtained by heat treatment of the fine silica powder at a temperature exceeding 700° C.

12. The process of claim 8 in which there is present from 0.1 to 20 times by weight of stannous salt per unit weight of the zero valent platinum phosphorus complex (D).

13. A process of claim 8 in which the platinum complex is expressed as $(Q_3P)_4Pt$, wherein Q is selected from the class consisting of a phenyl group and a phenoxy group.

14. The process of claim 8, wherein there may be further present in addition to the fired silica, a filler selected from the class consisting of fumed silica, carbon black, crushed quartz, diatomaceous earth, metal carbonate, clay, talc, titanium dioxide and iron oxide.

15. A process for forming a silicone article by hot air vulcanization of an SiH-olefin platinum catalyzed composition, which article has good resiliency and good compression set as well as does not foam when it is hot air vulcanized, comprising; (i) mixing:
   (A) 100 parts by weight of a polydiorganosiloxane having 1.98–2.002 organic groups per silican atom wherein said organic groups are selected from the group consisting of monovalent substituted and unsubstituted hydrocarbon groups and wherein 0.01–2 mole percent of the total number of organic groups are vinyl radicals and one molecule of the polymer contains at least 2 vinyl radicals, and the degree of polymerization goes over 1,000;
   (B) from 0.1 to 10 parts by weight of a polyorganohydrogensiloxane with at least 2 SiH bonds in 1 molecule;
   (C) from 10 to 200 parts by weight of a fine fired silica powder having a refractive index greater than 1.446 and an ignition loss not exceeding 3%, which is obtained by providing heat treatment for a fine silica powder wherein said fine silica powder is obtained through the acid decomposition of a silicate whose major ingredient is a sodium silicate; and
   (D) from 0.0001 to 0.2 parts by weight of a zero valent platinum phosphorus complex; and (ii) extruding the foregoing mixture of ingredients; and (iii) heating the extruded mixture of ingredients by hot air vulcanization at a temperature of 700° to 1,000° F. so as to vulcanize the extruded mixture of ingredients.

16. The process of claim 15, in which the organic group of said polydiorganosiloxane is a monovalent group selected from the class consisting of methyl, vinyl and phenyl groups and the proportion of the vinyl groups to the total quantity or organic groups is in the range of 0.01 to 2.0 mole percent.

17. The process of claim 15, wherein the degree of polymerization of the organo polysiloxane (A) is in the range of 2,000 to 10,000.

18. The process of claim 15, in which the fired silica (C) is obtained by heat treatment of the fine silica powder which is precipitated from a silicate solution by heating the fine silica powder at a temperature exceeding 700° C.

19. The process of claim 15, in which there is present from 0.1 to 20 times by weight weight of stannous salt per unit weight of the zero valent platinum phosphorus complex (D).

20. The process of claim 15, in which the platinum phosphorus complex is expressed as $(Q_3P)_4Pt$, wherein Q is selected from the class consisting of a phenyl group and a phenoxy group.

21. The process of claim 15, wherein the mixture of ingredients further includes an additional filler selected from the class conssiting of fumed silica, carbon black, crushed quartz, diatomaceous earth, metal carbonates, clay, talc, titanium dioxide and iron oxide.

* * * * *